United States Patent [19]
Mott

[11] Patent Number: 4,590,970
[45] Date of Patent: May 27, 1986

[54] PULSE WIDTH MODULATED PRESSURE SOURCE

[75] Inventor: Richard C. Mott, Harwood Heights, Ill.

[73] Assignee: Honeywell Inc., Minneapolis, Minn.

[21] Appl. No.: 749,114

[22] Filed: Jun. 26, 1985

Related U.S. Application Data

[63] Continuation-in-part of Ser. No. 534,896, Sep. 22, 1983, abandoned.

[51] Int. Cl.⁴ .............................................. F15C 1/04
[52] U.S. Cl. .................................... 137/828; 137/831; 137/624.15; 137/625.47; 318/696
[58] Field of Search ............... 137/826, 829, 830, 831, 137/828, 624.13, 624.15, 625.47, 874, 876, 487.5, 83; 318/119, 122, 123, 696, 685

[56] References Cited

U.S. PATENT DOCUMENTS

| | | | |
|---|---|---|---|
| 3,529,615 | 9/1970 | Kishel | 137/829 |
| 3,580,499 | 5/1971 | Bauer et al. | 137/487.5 |
| 3,613,709 | 10/1971 | Blaiklock | 137/831 |
| 3,651,824 | 3/1972 | Ishida | 137/83 |
| 3,741,018 | 6/1973 | Katz et al. | 137/826 |
| 3,874,407 | 4/1975 | Griswold | 137/624.15 |
| 3,934,603 | 1/1976 | Avery | 137/83 |
| 4,018,241 | 4/1977 | Sodal et al. | 137/487.5 |
| 4,098,247 | 7/1978 | Konishi et al. | 137/624.15 |
| 4,142,140 | 2/1979 | Wiesner | 318/696 |
| 4,281,619 | 8/1981 | Frick et al. | 137/625.47 |
| 4,361,164 | 11/1982 | Sakakibara et al. | 137/487.5 |
| 4,371,822 | 2/1983 | Otsuka et al. | 318/696 |
| 4,373,697 | 2/1983 | Phelps | 137/487.5 |
| 4,468,601 | 8/1984 | Chamron et al. | 318/696 |

FOREIGN PATENT DOCUMENTS

| | | | |
|---|---|---|---|
| 1650459 | 11/1970 | Fed. Rep. of Germany | 137/83 |
| 0851430 | 7/1981 | U.S.S.R. | 137/83 |

Primary Examiner—A. Michael Chambers
Attorney, Agent, or Firm—Charles J. Ungemach

[57] ABSTRACT

A pulse width modulated pressure source wherein the path between a fixed pressure source and an output receiving port is interrupted periodically so that the receiving port receives a modulated pressure of a controlled value less than the predetermined pressure source.

10 Claims, 11 Drawing Figures

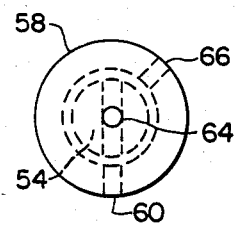
FIG. 2
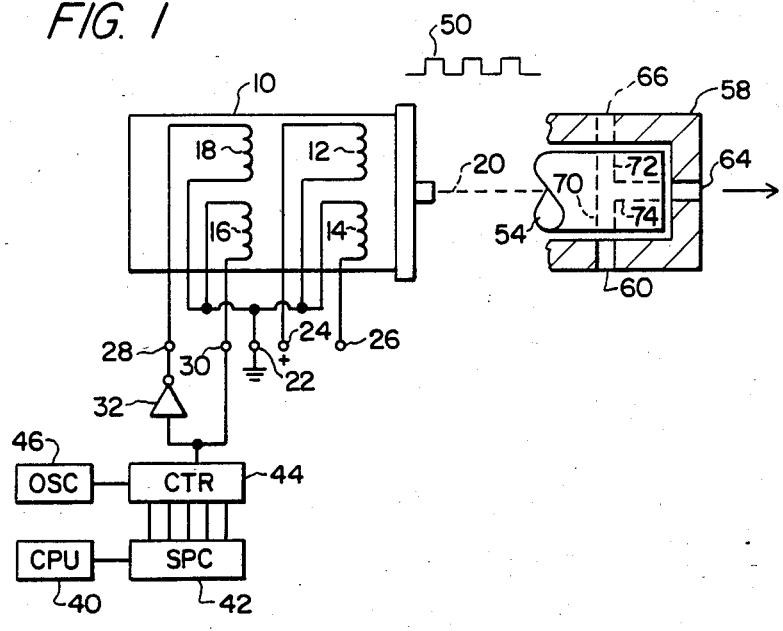
FIG. 1
FIG. 3
| STEP | 1 | 2 | 3 | 4 |
|------|-----|-----|-----|-----|
| 1 | ON | OFF | ON | OFF |
| 2 | ON | OFF | OFF | ON |
| 3 | OFF | ON | OFF | ON |
| 4 | OFF | ON | ON | OFF |
| 1 | ON | OFF | ON | OFF |
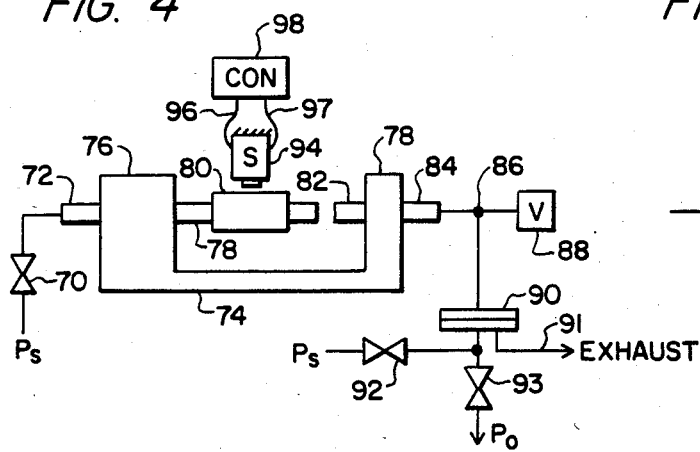
FIG. 4
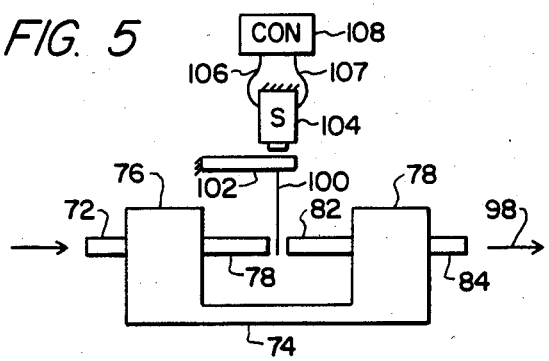
FIG. 5

PULSE WIDTH (% ON TIME)

4,590,970

PULSE WIDTH MODULATED PRESSURE SOURCE

This application is a continuation-in-part, of application Ser. No. 534,896, filed Sept. 22, 1983 now abandoned.

BACKGROUND OF THE INVENTION

With the advent of more and more computer controlled devices, it has become desirable to provide a pressure transducer operable to receive a computer's digital type input signals and to operate in accordance therewith to provide an analog pressure output of magnitude determined by the digital input. While it is, of course, possible to alter the digital input signals with an electrical digital-to-analog converter to produce an analog signal, this requires additional electronics that adds to the cost and does not produce a wholly satisfactory result.

SUMMARY OF THE INVENTION

The purpose of the present invention is to provide a source of pressure which can respond to digital type input signals to produce an analog pressure output. Briefly, the invention consists in providing a digital type "on-off" signal or binary signal from a computer that operates to produce a pulse width modulated input to a valve which then opens and closes between a pressure source and a pressure output. When the path between the input and output is open, the pressure at the output rises to a first fixed value for a first portion of the pulse and when the path is closed, the pressure falls to a second fixed value for a second portion of the pulse. As the pulse width causing an open path increases in duration, the output pressure will rise and as the pulse width causing a closed path increases, the output pressure decreases. The "off" and "on" pulses should produce a fixed low and a fixed high pneumatic pressure respectively. The output pressure may be smoothed and amplified if necessary to supply the source of analog pressure useful, for example, in control systems.

BRIEF DESCRIPTION OF THE DRAWINGS

FIG. 1 shows a schematic representation of a rotary valve controlled by a stepper motor;

FIG. 2 is an end view of the rotary valve;

FIG. 3 is a chart showing the control sequence of a stepper motor;

FIG. 4 shows one embodiment of a pressure source in the form of an interruptable fluid jet;

FIG. 5 shows a second embodiment of an interruptable fluid jet;

DETAILED DESCRIPTION OF THE PREFERRED EMBODIMENTS

Figure 6:
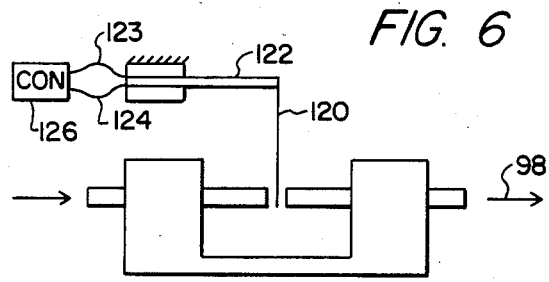
FIG. 6 shows a third embodiment of an interruptable fluid jet.

FIG. 1 shows a stepper motor 10 having four coils 12, 14, 16, and 18 operable to position an output shaft 20 in a desired position. The lower end of coil 12 and the upper end of coil 14 are connected together and to a terminal 22, connected to ground. In similar fashion, the lower end of coil 18 and the upper end of coil 16 are connected together and to terminal 22. The upper end of coil 12 is connected to a terminal 24 to which a source of positive voltage is applied and the lower end of coil 14 is connected to a terminal 26 which is not connected to anything. The upper end of coil 18 is connected to a terminal 28 and the lower end of coil 16 is connected to a terminal 30. Terminal 30 is connected through an inverter 32 to terminal 28.

The central processing unit 40 of a computer is shown in FIG. 1 having an output connected to a serial to parallel converter 42 which is connected in turn to control a counter 44 which also receives as an input the output of an oscillator 46. The output of counter 44 is connected to terminal 30 and will be in the form of a predetermined number of "on" and "off" signals in the form of digital "0" or "1" pulses (small and large signals could also be used or, any binary signal, i.e., one that has a property for which there exists two choices or conditions, one choice excluding the other such as opposite phases could also be employed if apparatus to distinguish between the phases were employed). It is seen that the signal received at terminal 30 will always be opposite to that signal received at terminal 28 by virtue of the inverter 32 and that terminal 24 will always receive a positive signal. Thus, as will be explained in connection with FIG. 3, the output of counter 44 will cause the shaft 20 to move to a first position for a predetermined time period and then to a second position for another predetermined time period and oscillate back and forth in this manner to produce a pulse width modulated signal on shaft 20 such as is shown by the wave shape 50 at the top of FIG. 1.

Shaft 20 is shown in FIG. 1 connected to a shaft 54 rotatable within a housing 58. Housing 58 has a first port 60 adapted to be connected to a source of supply pressure, a second port 64 adapted to be connected to the downstream control devices (not shown), and a third port 66 which is vented to atmospheric pressure. Shaft 54 has a first bore, 70, therein, a second bore, 72, therein, and a third bore 74 central to shaft 54 and perpendicular to the bores 70 and 72. The three bores 70, 72, and 74 are joined together at the center of shaft 54 with bore 74 maintaining a position in close approximation with the output port 64 in housing 58. In a first position of stepper motor 10, bore 70 will be aligned with the input 60 and in a second position of stepper motor 10 bore 72 will be aligned with port 66. This arrangement may better be seen in FIG. 2 where it is seen that port 66 lies at about a 45 degree angle with respect to port 60. The 45 degree angle is shown for clarity in FIG. 2 and, in actuality, the angle would be set to correspond with the rotary angle of say, one step of a stepper motor and would normally be much less than 45 degrees. With the 45 degree angle shown in FIG. 2, it is seen that shaft 54 has to move from the position shown in FIG. 2 clockwise approximately 45 degrees (or one stepper motor step) to be aligned with port 66.

By the arrangement of FIG. 1 and FIG. 2 it is seen that a source of pressure entering port 60 will, in the first position of stepper motor 10, flow through bores 70 and 74 to the output port 64. In the second position of stepper motor 10, shaft 54 will rotate to a position where output port 66 will be connected through bores 72 and 74 to port 64 thus allowing the pressure to exhaust to atmospheric. As a result, the output pressure from port 64 will assume a value less than the input pressure at port 60 by an amount dependent on the time during which port 60 is connected to the output 64 as compared with the time that port 66 is connected to the output 64. This time period is set by CPU 40 operating through counter 44. If desired, a pressure limiter may be connected to the output port 64 to prevent the output pressure from increasing beyond the desired value due to, for example, minor misalignments on the ports. For example, the pressure from output 64 could be made to flow into a chamber having a second output therein for connection to the utilization apparatus. The chamber would then have a diaphragm on one wall thereof which is spring biased inwardly and a nozzle connected to atmospheric pressure, pressing against the diaphragm. If the pressure in the chamber increased beyond the desired value, the bias of the spring would be overcome and the diaphragm would move away from the nozzle thereby venting some of the pressure to the atmosphere.

FIG. 3 is a chart showing the coil conditions for a standard stepper motor. Across the top the numbers 1, 2, 3 and 4 represent coils 18, 16, 12 and 14 respectively. The column on the left indicates that the stepper motor moves clockwise from position 1, to position 2, to position 3, to position 4, and on through however many positions the stepper motor has but repeating again after every fourth step. In other words, assuming that in a standard stepper motor coil 1 was energized, while coil 2 was deenergized, while coil 3 was energized, and coil 4 was deenergized, then, if the energization states of these coils was changed to the second condition where coils 1 was still energized, coil 2 was deenergized, coil 3 was now deenergized, and coil 4 was energized, the stepper motor would move from position 1 to position 2. Likewise, if the coils were then energized so that coil 1 was deenergized, coil 2 was energized, coil 3 was deenergized, and coil 4 was energized, the stepper motor would move from position 2 to position 3. Then by deenergizing coil 1, energizing coil 2, energizing coil 3, and deenergizing coil 4, the stepper motor would move to position 4. Finally, by energizing coil 1, deenergizing coil 2, energizing coil 3 and deenergizing coil 4, the stepper motor would move onto the fifth position identified as position 1 again. From then on the situation would repeat and the motor would continue moving in a clockwise direction. If at any time the coil energizations were reversed, the stepper motor would move in a counter-clockwise direction in the same manner.

In the present invention, only the steps in the bottom two rows, that is, from 4 to 1 and from 1 to 4, are utilized so that the stepper motor then oscillates between these two positions. This is accomplished by having coil 14 (corresponding to coil 4) not connected to anything and thus in a continually "off" condition, as is the case, in the bottom two rows and in FIG. 3 and by having coil 12 (corresponding to coil 3) permanently "on", as is the case, in the bottom two rows and in FIG. 3 by being connected to a source of positive voltage. Then when coils 18 and 16 (corresponding to coils 1 and 2 in FIG. 3) are reversed by change of signal from counter 44, the stepper motor will go from step 4 to step 1 and vice versa. Thus, for example, the output of the counter 44 is a 1, then the signal on terminal 30 will be "1" or "+" and thus "on" and, because of the inverter 32, the signal on terminal 28 will be "0" or "−" and thus "off". When the output from counter 44 is a zero, the signals on the terminals 28 and 30 are also opposite this time with the signal on 28 being a "1" or "on" while the signal on 30 is a "0" or "off". Accordingly, the stepper motor will oscillate back and forth between position 4 and position 1 as the output of counter 44 changes from a "0" to a "1" and a "1" to a "0". By appropriately varying the "on" and "off" times as controlled by counter 44, the output pressure at port 64 in FIG. 1 will be maintained at some predetermined value as is desired.

FIGS. 4 through 9 show alternate embodiments of the present invention in which a fluid jet is utilized rather than a rotating valve. Of course, with fluid jets the pressures are lower since the lines are very narrow and accordingly it is usually necessary to amplify the output in order to increase the pressure.

In FIG. 4 a source of fluid pressure $P_S$ is transmitted through a restriction 70 to an input port 72 mounted in a housing 74. Housing 74 is constructed in a "U" shape with a vertically extending left side 76 and a vertically extending right side 78. Input port 72 extends through extension 76 and emerges as a line 78 with a magnetic coating 80 thereupon. A receiver port 82 extends through the vertical abutment 78 and is connected to an output port 84 which in turn is connected to a junction 86 and from there to a volume 88 and also to an amplifier 90 having an exhaust connection 91 and an output connected through a restriction 92 to the source of pressure $P_S$ and also connected through a restriction 93 to provide the output pressure $P_0$.

Figure 11:
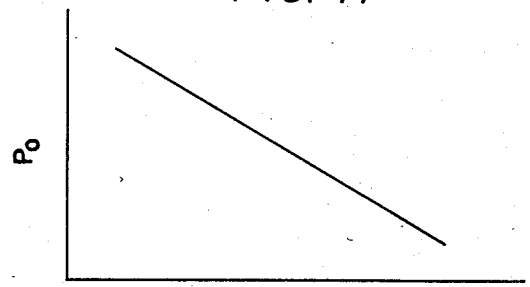
FIG. 11 shows the variation of pressure with pulse width modulation.

Mounted adjacent the magnetic material 80 is a solenoid 94 energized through a pair of leads 96 and 97 from a pulse width modulated control 98 which may be like that shown in FIG. 1 and which will supply pulse modulated signals to the solenoid 94. As long as the solenoid 94 is deenergized, the stream of fluid entering the input port 72 passes through the line 78 through the air space between line 78 to receiver 82 and on to the output 84. When the solenoid 94 is energized, the line 78 is pulled upwardly thereby disrupting the flow between the input line 78 and the receiver 82 at which time there is no output at the output line 84. When the solenoid 94 is again deenergized, line 78 moves back into the position shown in FIG. 4 and the pressure is again received at output port 84. The pressure at port 84 is smoothed by volume 88 and presented to amplifier 90 where it is amplified and passed through a restriction 92 to provide a smoothed amplified output pressure P whose magnitude depends upon the amount of time the solenoid 94 was energized. As seen in FIG. 11, the output pressure $P_0$ is at a maximum when the pulse width or percent "on" time is the least and decreases as the percent "on" time of solenoid 94 increases.

FIG. 5 is substantially the same as FIG. 4 and common components carry the same reference numerals. Some of the input components such as the source of pressure and restricter 70 and the output components such as volume 88 amplifier 90 and restricter 92 have been omitted for simplicity. Again, a U-shaped member 74 is utilized in FIG. 5 with an input port 72 passing through the vertical abutment 76 to input line 78. A receiver line 82 is mounted in the vertical abutment 78 and is connected to an output port 84 to produce the output pressure shown by arrow 98. The difference between FIG. 5 and FIG. 4 is that in FIG. 5 a downwardly extending reed 100 is connected to a bendable magnetic member 102 and is positioned to interrupt the flow of fluid between line 78 and receiver 82. Magnetic member 102 is moved into and out of the position shown in FIG. 5 by a solenoid 104 energized through a pair of conductors 106 and 107 from a controller 108 which, like controller 98 in FIG. 4, may operate to provide a pulse width modulated signal. Again by periodically interrupting the flow of fluid between line 78 and receiver 82 the output indicated by arrow 98 will be a value which when smooth and amplified will provide a pressure output $P_0$ of the desired magnitude.

FIG. 6 is like FIG. 5 except now instead of a reed 100 connected to a magnetic member 102, a reed 120 is connected to a piezoelectric bender bar 122 which is energized by a pair of conductor 123 and 124 from a control 126 which again will be modulated by a pulse width output so that again the pressure output shown by arrow 98 when smoothed and amplified will be the desired analog pressure signal.

Figure 7:
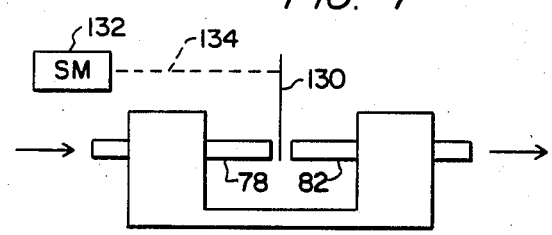
FIG. 7 shows a fourth embodiment of an interruptable fluid jet.

FIG. 7 is like FIG. 6 except that the reed 120 is replaced now by a vane 130 which is mounted for rotation by a stepper motor 132 operating through a mechanical connection shown as dashed line 134. Stepper motor 132 may be like that described in connection with FIG. 1 so that vane 130 is oscillated from a position where it blocks the passage between line 78 and receiver 82 periodically in accordance with the output of a counter such as 44 in FIG. 1.

Figure 8:
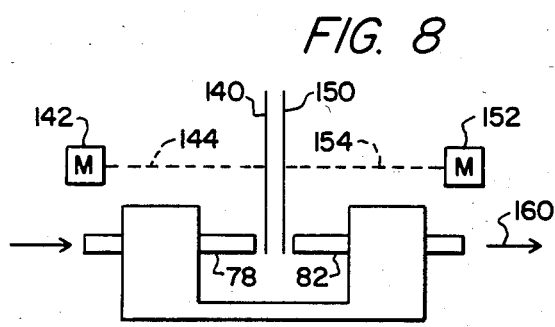
FIG. 8 shows a fifth embodiment of an interruptable fluid jet.
Figure 10:
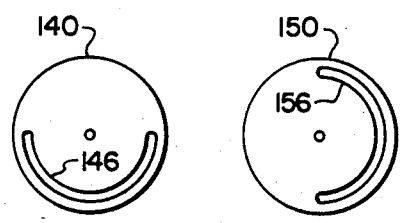
FIG. 10 shows a pair of disks useful in the apparatus of FIG. 8.

FIG. 8 shows a modification in which two rotating members are utilized, the first is a disk 140 mounted for rotation by a motor 142 operating through a mechanical connection shown as dashed line 144. Disk 140 may be formed like that shown in the left in FIG. 10 wherein a slot 146 is formed. Slot 146 allows passage of the fluid between line 78 and receiver 82 when motor 142 has rotated to a position where slot 146 is adjacent the output of line 78.

Also shown in FIG. 8 is a second disk 150 mounted for rotation by a second motor 152 operating through a mechanical connection shown as dashed line 154. Disk 150 may be like that shown on the right in FIG. 10 wherein a slot 156 is made similar to that shown in disk 140. Disk 150 will, however, be mounted on shaft 154 in such a manner that portions of slot 156 and 146 overlap. The amount of overlap will be chosen so that fluid may flow from line 78 through slot 146 and 156 to receiver 82 a predetermined percentage of the time in a single rotation of both motors 142 and 152. That is to say while motors 142 and 152 rotate at the same speed, fluid can only pass between line 78 and receiver 82 when both slots exist in the path therebetween. To change the output pressure shown by arrow 160, disk 140 or 152 need only be rotated in one or the other directions with respect to the other disk to change the pulse width modulation.

Figure 9:
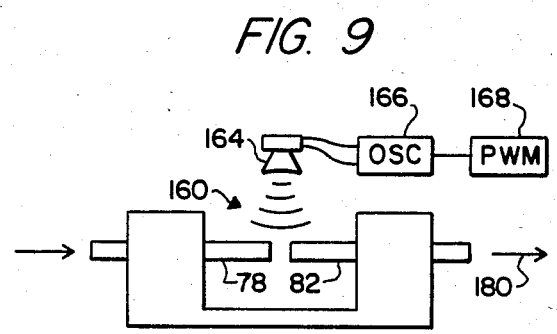
FIG. 9 shows a sixth embodiment of an interruptable fluid jet.

Finally, FIG. 9 shows a system in which sound waves shown generally by arrow 160 are produced by a speaker 164 which is driven by an oscillator 166 from a pulse width modulated control 168. When the speaker produces sound waves, the flow of fluid between line 78 and receiver 82 is interrupted but when the speaker is silent, flow passes between these two ports to produce an output pressure shown by arrow 180. As before, the amount of on time of speaker 160 will control the size of the pressure at the output of the system in a manner similar to that described in connection with FIGS. 4 through 8.

In all of the embodiments, a pressure limiter at the output port, as described in connection with FIG. 1, may be used to assure that the output pressure does not exceed the desired value.

It is therefore seen that I have provided a novel means for producing a controlled pulse width modulated output pressure source whose magnitude is controlled by a digital input signal. Many modifications and changes will occur to those skilled in the art and I do not wish to be limited to the specific disclosures used in connection with the preferred embodiments. I wish only to be limited by the following claims.

I claim:

1. A pressure source of a desired magnitude dependent upon the respective durations of pulse width modulated binary input signals comprising:
   pressure source means of predetermined magnitude having an output member to transmit pressure;
   receiving means having an input member to receive pressure;
   interruptable path means having an input to receive the binary input signals and operable upon receipt of signals of a first characteristic to fully open a flow path between the output member and the input member for a first pulse width modulated control period and upon receipt of signals of a second characteristic to completely close the flow path between the output member and the input member for a second pulse width modulated control period, the duration of the first pulse width modulated control period compared to the duration of the second pulse width modulated control period causing the pressure at the receiving means to be of the desired magnitude wherein said interruptable path means includes a valve having a rotatable shaft with first and second ports formed therein and a housing member around said rotatable shaft with first and second ports formed therein the second port of the housing means lying adjacent of the second port of the shaft during all positions of rotation of the shaft; means rotating the shaft between first and second positions, in the first position the first port of the housing means being aligned with the first port of the shaft and in the second position the first port of the housing means being non-aligned with the first port of the shaft.

2. Apparatus according to claim 1 further including a stepper motor operable to position the shaft in the first and second positions, the stepper motor being controlled by binary input signals originating from a computer.

3. Apparatus according to claim 1 wherein the interruptable path includes a space between the pressure source and the receiving means and a flow interrupting member is oscillated into and out of the space.

4. Apparatus according to claim 3 wherein the flow interrupting member is positioned by a solenoid operating through a magnetic member attached to the flow interrupting member.

5. Apparatus according to claim 3 wherein the flow interrupting member is attached to a bender bar, the bending of which operates to move the flow interrupting member into and out of the space.

6. Apparatus according to claim 3 when the flow interrupting member is rotatedly controlled by a stepper motor into and out of the path between the pressure source and the receiving means.

7. Apparatus according to claim 3 wherein the flow interrupting member is a sound transducer which operates to produce sound waves that interrupt the path between the pressure source and the receiving means.

8. Apparatus according to claim 3 wherein the flow interrupting member comprises two motors which operate through two disks that are angularly separated from each other, each disk having a hole through a portion of the disk so that pressure can pass from the pressure source to the receiving means through the holes during a predetermined portion of the rotation of both disks.

9. Apparatus according to claim 1 wherein the interruptable path includes a space between the pressure source and the receiving means and wherein means are provided to move the pressure source and the receiving means into and out of alignment to interrupt the flow path.

10. Apparatus for producing a pressure of desired magnitude from a pressure source of predetermined magnitude comprising:

input pressure means having an input for connection to the pressure source, and a conduit to conduct the pressure to a first port;

output means having a second port to receive pressure from the first port and a conduit to conduct the pressure to an output; and interruptable path means operable in a first condition to disrupt the space between the first and second ports for a predetermined pulse width modulated time so as to reduce the pressure received at the output by a sufficient amount to make it equal to the desired pressure; the interruptable path including a space between the pressure source and the receiving means and including a flow interrupting member oscillated into and out of the space, which flow interrupting member comprises two motors which operate through two disks that are angularly separated from each other, each disk having a hole through a portion of the disk so that pressure can pass from the pressure source to the receiving means through the holes during a predetermined portion of the rotation of both disks.

* * * * *